US012738277B1

(12) United States Patent
Glaude et al.

(10) Patent No.: US 12,738,277 B1
(45) Date of Patent: Sep. 15, 2026

(54) ENTITY MANAGEMENT FOR LANGUAGE MODELS

(71) Applicant: Amazon Technologies, Inc., Seattle, WA (US)

(72) Inventors: Hadrien Glaude, Boston, MA (US); Sayan Chowdhury, Waltham, MA (US); Pavel Aleksandrovich Rusin, Redmond, WA (US); Anushree Venkatesh, San Mateo, CA (US); Imre Attila Kiss, Arlington, MA (US); James J Logan, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 208 days.

(21) Appl. No.: 18/541,595

(22) Filed: Dec. 15, 2023

(51) Int. Cl.
*G10L 15/22* (2006.01)
*G10L 15/28* (2013.01)

(52) U.S. Cl.
CPC ............ *G10L 15/285* (2013.01); *G10L 15/22* (2013.01); *G10L 2015/223* (2013.01)

(58) Field of Classification Search
USPC ................ 704/246, 247, 251, 252, 270, 275
See application file for complete search history.

(56) References Cited

U.S. PATENT DOCUMENTS

2022/0199079 A1* 6/2022 Hanson ................... H04L 51/02
2023/0245654 A1* 8/2023 Shrivastava ........ G10L 15/1822 704/243
2023/0325384 A1* 10/2023 Nallapati ............ G06F 16/2423 707/760
2024/0419918 A1* 12/2024 Vangala ............ G06F 16/90332

* cited by examiner

*Primary Examiner* — Leonard Saint-Cyr
(74) *Attorney, Agent, or Firm* — K&L Gates LLP

(57) ABSTRACT

Devices and techniques are generally described for entity management. In various examples, a natural language request comprising a reference to an entity may be received. Resolved entity data associated with the entity may be determined. Identifier data associated with the resolved entity data may be generated and the resolved entity data may be stored in association with the identifier data in a session cache. A first prompt that comprises the identifier data may be generated. A language model (LM) may generate a data request that includes the identifier data as an input parameter. At least a portion of the resolved entity data may be received from the session cache using the data request. A second prompt that comprises at least the portion of the resolved entity data may be generated and used to perform an action with respect to the entity in response to the natural language request.

20 Claims, 7 Drawing Sheets

ENTITY MANAGEMENT FOR LANGUAGE MODELS

BACKGROUND

People can interact with computing devices using spoken commands. Natural language processing is used to transform the spoken requests into a computer directive for performing a task.

DETAILED DESCRIPTION

Figure 1:
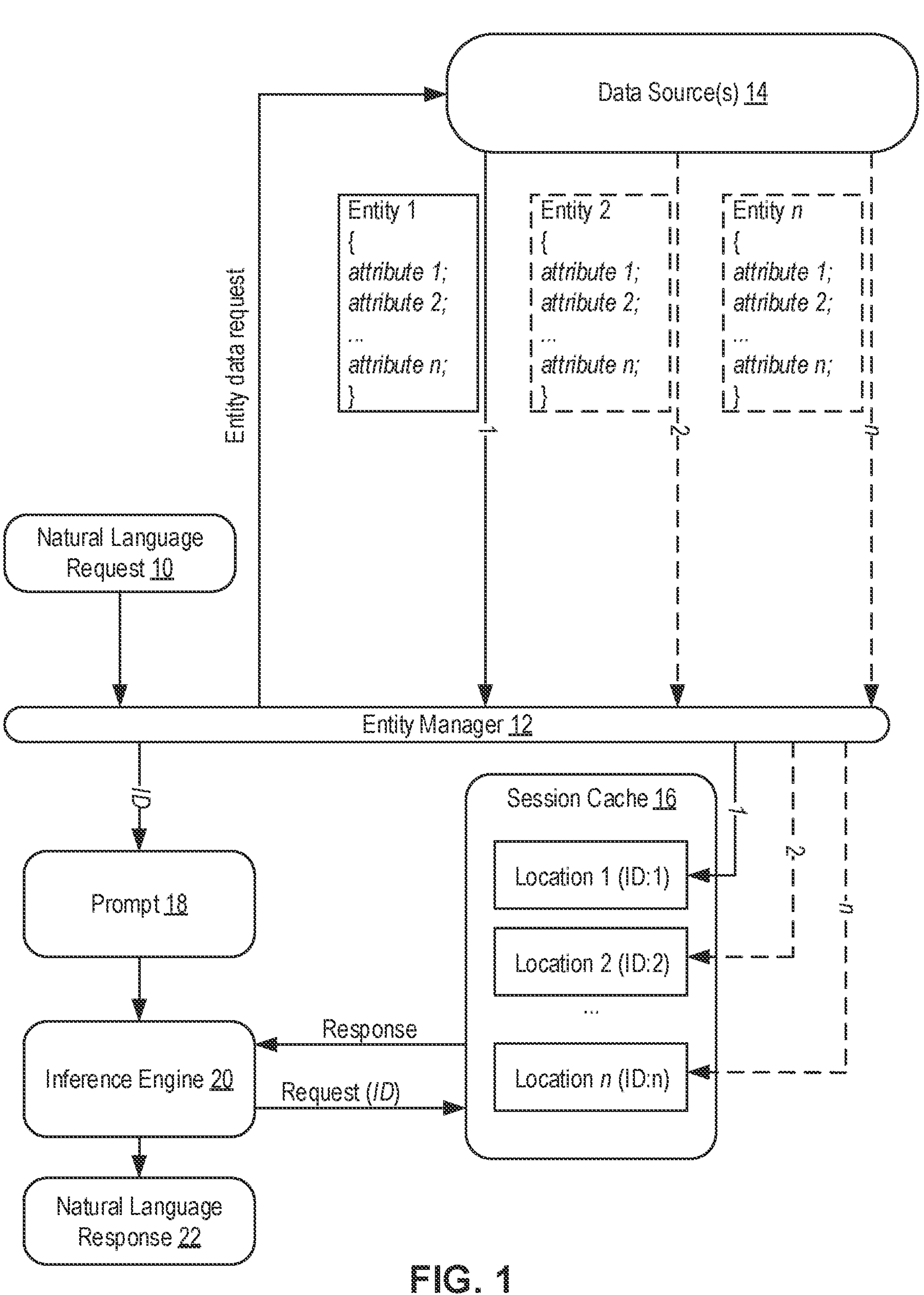
FIG. 1 is a block diagram illustrating an example system for entity management for language models (LMs), in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Devices with integrated processing capabilities are often configured with network communication capability and/or other computing functions allowing the devices to send data to and/or receive data from other devices. In some examples, such devices may include voice-enabled personal assistants and/or other natural language processing interfaces that may be used to control the devices, answer questions, communicate with other people/devices, and/or otherwise interact with the devices and/or other devices. As such devices become more and more prevalent in both the home, office, public spaces, quasi-public spaces (e.g., hotels, offices, retail spaces), and elsewhere generally, and as the technology matures, new services and features are being developed. For instance, in some cases devices may be paired or otherwise grouped together with one another to enable certain functionality. For example, a device that includes voice-based personal assistant functionality may be paired with a device including a display so that spoken commands may be used to control content output by the display device. In another example, content may be transferred from one device to another device in response to user requests and/or other triggering events (e.g., pre-defined routines including a sequence of user-defined actions, presence information, etc.).

Automatic speech recognition (ASR) is a field of computer science, artificial intelligence, and linguistics concerned with transforming audio data associated with speech into data (e.g., text or other machine representation data) representative of the words in the speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

NLU processing may include an intent classification process by which intent data is determined that represents the intent (e.g., goal) of the input natural language data (e.g., text). Intent data may be sent to a skill that may, in turn, perform some action based on the intent data. In some examples, language model (LM)-based natural language processing approaches may not use NLU intent classification. For example, LMs (such as large language models (LLMs)) may be effective to semantically interpret natural language inputs using the parametric knowledge learned by such models during training. An LLM is an artificial intelligence (AI) model that may be capable of processing and generating human-like text based on the latent information it has learned from vast amounts of training data. The term "large" refers to the size of these models in terms of the number of parameters or weights, which are the values that the model learns during training to make predictions and generate text. In some examples, natural language processing (whether LM-based or other NLU-based) may further include named entity recognition (NER), which is a technique used to identify segments of named entities in text data and to categorize the named entities into various predefined classes. Categorization of named entities into such classes is often referred to as "tagging" the named entities. In this context, "NER tags" are metadata that designates a particular class to a named entity. In text, named entities refer to terms that represent real-world objects such as people, places, organizations, locations, etc., which are often denoted by proper nouns.

In some examples, natural language processing may include entity resolution (ER). Entity resolution refers to disambiguation of an entity (e.g., a named entity in text) according to records stored in memory (e.g., in a database). For example, if text includes the proper noun "London," ER may be used to perform disambiguation to determine whether to link the named entity to a database entry for London in Ontario or a database entry for London in the United Kingdom. In various examples, the NER classes may be used during ER processing to disambiguate between multiple entities.

As noted above, some natural language processing flows may employ one or more LMs, such as one or more LLMs, in order to process natural language requests. LLMs may have millions, billions (or even more) parameters, which enable such models to capture complex patterns and nuances in language that, in turn, allow the models to understand and generate more natural-sounding text (relative to previous approaches). Examples of LLMs include generative pre-trained transformer models that may be trained for natural language generation tasks, image generation tasks, etc., and even non-generative examples such as BERT (bidirectional encoder representations from Transformers), etc.

In a generative context, an LM may generate text that is responsive to the input prompt provided to the LM. LMs excel at generating natural sounding text that appears as though it has been generated by a native speaker in the relevant language. In addition to fluency, generative LMs are able to generate detailed, relevant, and largely accurate responses to input prompts in many cases due to the large amount of latent information the generative LM has learned during training.

LMs are typically trained on massive datasets that include a wide variety of text from various sources, enabling the LMs to understand grammar, context, and the relationships between words and sentences. In various examples described herein, a natural language processing flow may employ an LM to process a natural language request. In some examples, an LM-based natural language processing flow may generate a prompt from automatic speech recognition (ASR) output data representing a spoken user utterance. The prompt may be fed into the LM. In other examples, a text input (e.g., text typed on a keyboard) may be used as an input prompt (or may be used to generate an input prompt) to the LM. The LM may be trained to output a text-based action plan which may be a formatted into a series of computer-executable actions (including API calls to various subsystems) that may be taken in order to process the natural language request. An API call refers to sending a request to an API (including any relevant input parameters) of a compute service. In various examples, an LM-based processing flow may be a recursive process wherein the initial action plan may be executed (e.g., by making various API calls to API providers to receive results/responses), and the responses may be used to generate updated LM prompts which may then be input into the LM for generation of an updated action plan. An LM-based processing flow may not use NLU to determine intent data, and may not route intent and/or slot data (e.g., named entities) to a skill or other natural language processing system. Instead, the action plan generated by the LM-based processing flow may use a series of function calls to take the necessary actions used to respond to the natural language request. An LM-based natural language processing flow is described in further detail below.

While LMs are powerful tools capable of understanding and responding to natural language inputs, ER is still needed by LM-based natural language processing systems in order to effectively respond to a natural language request with respect to an appropriate entity. In some examples, a natural language processing flow may employ ER to resolve an entity referenced by the user (e.g., as part of a natural language request) in order generate a prompt to be processed an LM. However, conventional approaches involving ER can result in disappointing user experiences. For example, during a communication session in which a user asks multiple questions about the same entity, a conventional natural language processing flow may resolve the entity after each question asked by the user, as shown in the following example:

{
User input designator: Who is the presenter of Example Radio Show A?
Thought: I need to generate an action
Action: (take an action by calling an API) {"question": "Who is the presenter of Example Radio Show A?"}
Observation: (what the API execution returns) John Doe is best known as the presenter of the Example Radio Show A, which is a popular radio program in Europe.
Thought: I can generate a response without extra actions
Response: John Doe is best known as the presenter of the Example Radio Show A, which is a popular radio program in Europe.
User input designator: How old is he?
Thought: I need to generate an action
Action: (take an action by calling an API) {"question": "How old is John Doe?"}
Observation: (what the API execution returns) John Doe is 10 years old and was born on Jan. 1, 2013.
Thought: I can generate a response without extra actions
Response: John Doe is 10 years old and was born on Jan. 1, 2013.
}

As shown in the above example, the LM carries over the mention of John Doe to reformulate the natural language request "How old is he?" into "How old is John Doe?," however, John Doe is resolved twice (through two separate API calls) with different results. For example, the first response refers to John Doe the radio presenter, whereas the second response refers to a different, younger John Doe (e.g., a famous child actor). This example flow leads to user frustration as their follow-up question (intended to refer to the radio presenter) is answered incorrectly. Further, prompt bloat is introduced through the insertion of excess data that is irrelevant to the natural language request (e.g., data about the child actor John Doe, as well as other data about the resolved entity "Example Radio Show A" not pertaining to the presenter) into prompts for the LM. For example, these entities may each be associated with a large amount of attributes (i.e., characteristics describing the entity) and this attribute data may be inserted into the prompt each time the user asks a question.

"Prompt bloat" refers to including increasingly large amounts of contextual information into the input prompt used by LMs during processing. Prompt bloat can negatively affect LM performance for a variety of reasons. As seen above, prompt bloat can introduce noise (irrelevant information) which may misdirect the LM and cause the LM to focus on data immaterial to the original request. Further, a longer prompt requires additional processing by the LM, thereby consuming significantly more computational resources and/or introducing latency.

Additionally, in some cases, an LM may fail at integrating relevant context data (e.g., prior conversation history) when retrieving information for a response to a user input. For example:

{
User input designator: I like sci-fi movies.
Response: Sci-fi movies are a great way to escape into a world of possibilities and explore the limits of what is possible. What are some of your favorite sci-fi movies?
User input designator: When will [Sequel to Sci-Fi Movie A] be released?
Action: (take an action by calling an API) {"question": "When will [Sequel to Sci-Fi Movie A] be released?"}
Observation: [Sequel to Video Game based on Sci-Fi Movie A] was released in 1992 and it is available on [list of video game platforms].
Thought: I can generate a response without extra actions
Response: [Sequel to Video Game based on Sci-Fi Movie A] was released in 1992. It is available on [list of video game platforms].
}

As shown in the above example, the LM fails at reformulating the user's query for the API call to integrate information about the relevant context, specifically that the user is looking for an upcoming movie. When asked about a sequel to a recent remake of a science fiction movie, the API call returns information about an already released video game that was based on the science fiction movie.

To solve the above described issues, described herein is a system that may manage entity information in a more efficient manner that may be more useful for LM-based natural language processing. In various examples described herein, a machine learning architecture is described that is able to effectively manage entity data including how entity data is generated, persisted, deleted, and acted upon in connection with an LM-based system. As further described herein, example embodiments may cache resolved entity data and represent the cached resolved entity data in an LM prompt using temporal identifier data for a communication session. In this manner, rather than re-resolving an entity in response to each natural language request and continuously inserting resolved entity data itself into LM prompts, an LM is instead directed (via identifier data in a prompt) to the cached resolved entity data as the source for retrieving information about a particular entity. In various examples, the entity management system and techniques described herein may be used in the context of LM-based processing flows (as described below in connection with FIG. 6) to improve the generative output of such LM-based systems. Advantageously, such a system may avoid inaccurate LM output by reducing prompt bloat (and, consequently, significantly reduce computational resource consumption and/or latency). In this regard and as described in further detail below, the systems and techniques described herein may have reduced compute and/or memory requirements relative to previous approaches making such systems and techniques well-suited for edge device deployment. Advantageously, deployment of the ER systems and techniques described herein at the edge may reduce latency and provide an improved user experience relative to natural language processing systems and/or ER systems deployed in the cloud.

As mentioned above, ASR is a field of computer science, artificial intelligence, and linguistics concerned with transforming audio data associated with speech into text data and/or other ASR output data representative of that speech. In a voice assistant context, such as those described herein, ASR may be used to transform spoken utterances into text that can then serve as the input to an LM or other language model (e.g., natural language processing, artificial intelligence, and linguistics concerned with enabling computers to derive meaning from text input containing natural language, resulting in specific executable command data (e.g., intent data) or other type of instructions). Text-to-speech (TTS) is a field of computer science, artificial intelligence, and linguistics concerned with enabling computers to output synthesized speech. ASR, language models (e.g., natural language generative models such as some LMs), and TTS may be used together as part of a natural language processing system. As used herein, natural language input data may comprise audio data (e.g., representing a user request or command), text data, and/or other representation data representing natural language for input into a natural language processing system.

The various techniques described herein may be used in a variety of contexts, including in natural language processing enabled devices (e.g., devices employing voice control and/or speech processing "voice assistants") and/or systems, as well as in smart home devices. For example, some models of camera-integrated doorbells include speech processing functionality to allow users to have a virtual assistant interact with people at the door to take messages, etc.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device identifier data, device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a keyword and/or phrase, which are collectively sometimes referred to herein as a "wakeword", is detected in the audio data. In some examples, when a wakeword is detected, the speech processing enabled device may enter a "sending mode," "audio capturing mode," and/or other type of processing mode in which audio detected by the microphones following the wakeword (e.g., data representing user request data spoken after the wakeword) may be sent to natural language processing computing component(s) (either locally or remotely) for further natural language processing (e.g., ASR, NLU, LM inference, etc.). In various examples, the wakeword detection component may be used to distinguish between audio that is intended for the natural language processing system and audio that is not intended for the natural language processing system.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models are machine learning models that include an encoder network and a decoder network. LMs such as LLMs are often implemented using transformer models. The encoder takes an input (e.g., a "prompt") and generates feature representations (e.g., feature vectors, feature maps, etc.) of the input. The feature representation is then fed into a decoder that may generate an output based on the encodings. In natural language processing, transformer models take sequences of words as input. A transformer may receive a sentence and/or a paragraph (or any other quantum of text) comprising a sequence of words as an input.

The encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. Each encoder layer passes its token output to the next encoder layer. The decoder network takes the tokens output by the encoder network and processes them using the encoded contextual information to generate an output (e.g., the aforementioned one-dimensional vector of tokens). The output data may be used to perform task-specific functions (e.g., action plan generation for an LM-based natural language processing flow, etc.). To encode contextual information from other inputs (e.g., combined feature representation), each encoder and decoder layer of a transformer uses an attention mechanism, which for each input, weighs the relevance of every other input and draws information from the other inputs to generate the output (represented by attention scores). Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token i, the input embedding $x_i$ is multiplied with each of the three weight matrices to produce a query vector $q_i=x_i W_Q$, a key vector $k_i=x_i W_K$, and a value vector $v_i=x_i W_V$. Attention weights are calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to 1. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of $(W_Q, W_K, W_V)$ matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data. In various examples described herein, the position embedding may describe an order of a sequence of words.

Each decoder layer comprises three components: a self-attention mechanism (e.g., scaled dot product attention), an attention mechanism over the encodings, and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

FIG. 1 is a high-level example representation of an example LM-based system 100 that may provide effective entity management to ensure dialog consistency when entities are referenced throughout a conversation. Although the system 100 is described in terms of LM-based processing, it should be noted that other generative models may be used apart from LMs.

Figure 6:
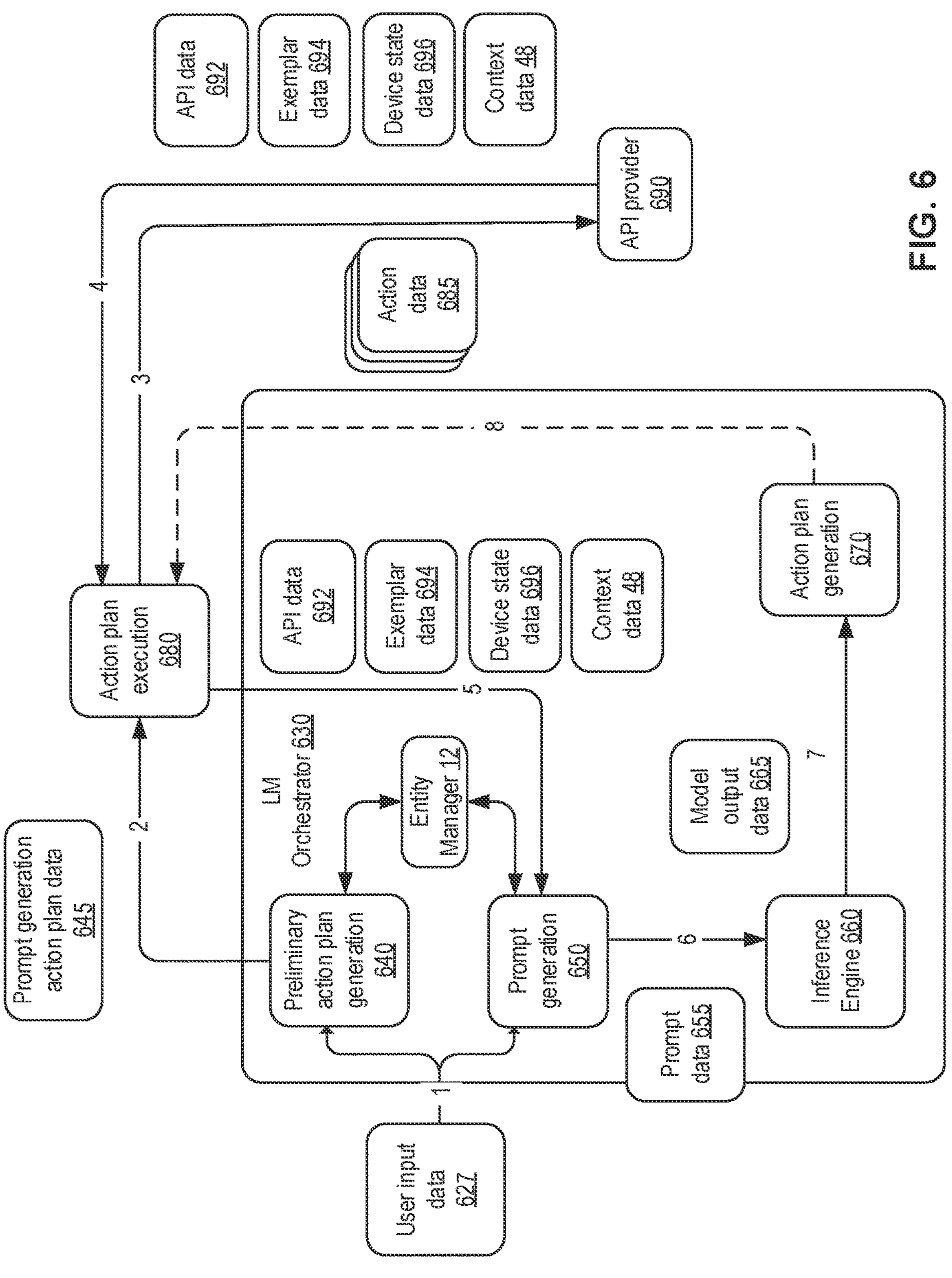
FIG. 6 depicts an example LM-based natural language processing flow, in accordance with various aspects of the present disclosure.

As shown in FIG. 1, a natural language request 10 may be provided to an entity manager 12 (which may comprise an LM-based system or one or more components of an LM-based system, such as a component of an LM orchestrator and/or the like, as described further herein in connection with FIG. 6). In some embodiments, natural language request 10 may reference one or more entities, and, in response to receiving the natural language request, the entity manager 12 may perform (using one or more components of an LM-based system) ER techniques to resolve entity information for one or more entities mentioned in and/or referenced by the natural language request. As shown, the entity manager 12 may generate and send an entity data request to one or more data sources 14. In some embodiments, the entity data request may comprise one or more API calls configured to retrieve detailed information about the one or more entities referenced in the natural language request 10. For example, the data sources 14 may be external data sources (e.g., external computing devices managed by an entity different from an entity managing the LM-based system) or internal data sources (e.g., computing devices managed by the same entity managing the LM-based system). Regardless of the configuration of the data sources 14, the data sources 14 may host data that may be retrieved via one or more API calls. For example, APIs that represent graph-based search engines, Internet search engines, and/or other information retrieval services may be used in order to resolve entity information for a given entity mention and/or entity reference in the natural language request 10. For example, if a user says "when was [song title] first released", entity manager 12 may generate and send an entity data request to one or more data sources 14 to resolve the [song title] to one or more entities (e.g., specific instances of one or more songs that may have structured metadata including attributes such as the relevant song title, along with various other attributes and/or information about such songs (e.g., metadata indicating a release date, record label, genre, track length, album name, artist name, etc.).

In some embodiments, in response to the entity data request, resolved entity data (e.g., shown as Entity 1 in FIG. 1) may then be returned to the entity manager 12. In some embodiments, multiple instances of resolved entity data (e.g., Entity 2 through Entity n) may be returned to the entity manager 12 in response to one or more entity data requests. Resolved entity data may comprise structured metadata indicating a plurality of attributes of a respective entity. For example, for a country music singer entity, the attributes may describe various information about the country music singer, such as birth date, height, songs, albums, release dates, tour dates, events, television appearances, etc. To obtain resolved entity data, the entity manager 12 may make an API call to an ER service which may perform one or more ER techniques to determine and return resolved entity data. As noted above, ER involves identifying and resolving references to the same real-world entities within or across datasets (e.g., natural language inputs). There are several approaches to ER. For example, ER may involve deterministic matching, where predefined rules or algorithms are used to match records based on exact attribute matches. In some examples, ER may involve probabilistic matching, which involves assigning probabilities to attribute matches and calculating a weighted score to determine the likelihood of a match. In some examples, ER may involve machine learning-based matching, which utilizes ML algorithms to train models that can predict similarity between records.

In some embodiments, the entity manager 12 may then generate identifier data for the resolved entity data. For example, identifier data may comprise an identifier, such as an integer, string, character (e.g., ASCII character), or the like, that uniquely identifies the resolved entity data from other resolved entity data generated during the same dialog session and/or relevant time period. As shown in FIG. 1, the entity manager 12 may also store the resolved entity data in a session cache 16. The session cache 16 may comprise a location (e.g., a logical address) or series of locations in memory (e.g., a memory of a remote device as discussed below in connection with FIG. 5) in which resolved entity data may be stored for a particular communication session. The entity manager 12 may also generate a mapping between the identifier data and the particular memory location of the session cache 16 in which the first resolved entity data is stored. In some embodiments, generating the mapping between the identifier data and the memory location of the session cache 16 may comprise storing indications of the identifier data and the memory location in the same column or row of a relational database or otherwise generating an association between the identifier data and the memory location in another similar data structure. In this manner, execution of requests (e.g., API calls) and other subsequent processes performed by the LM-based system may refer to the mapping using the identifier in order to retrieve data from the correct memory location.

In some embodiments, the entity manager 12 may generate a prompt 18 to be provided to an inference engine 20 (e.g., an LM (such as an LLM) or other model). As shown, identifier data may be inserted into the prompt (rather than, for example, the entirety of the resolved entity data). For example, for a natural language request that asks "what is the latest album by [Country Music Singer A]?" the prompt may reformulate the request into "what is the latest album by <id>1</id>?" with <id>1</id> being the identifier data that represents [Country Music Singer A] and maps to a location in the session cache 16 in which resolved entity data for Country Music Singer A is stored. Subsequently, the inference engine 20 may request (e.g., via an API call or the like) particular data from the session cache by passing the identifier data as an input parameter of the request. In response, at least a portion of the structured metadata of the first resolved entity data may be returned from the session cache, which can be inserted into a new prompt which the inference engine 20 can process to produce a natural language response 22 to the original natural language request 10. In various examples, as discussed herein, an LM-based processing flow performed by the LM-based system may be a recursive process wherein the initial action plan may be executed (e.g., by making various API calls to API providers to receive results/responses), and the responses may be used to generate updated LM prompts (that also include identifier data) which may then be input into the LM for generation of an updated action plan.

Figure 2:
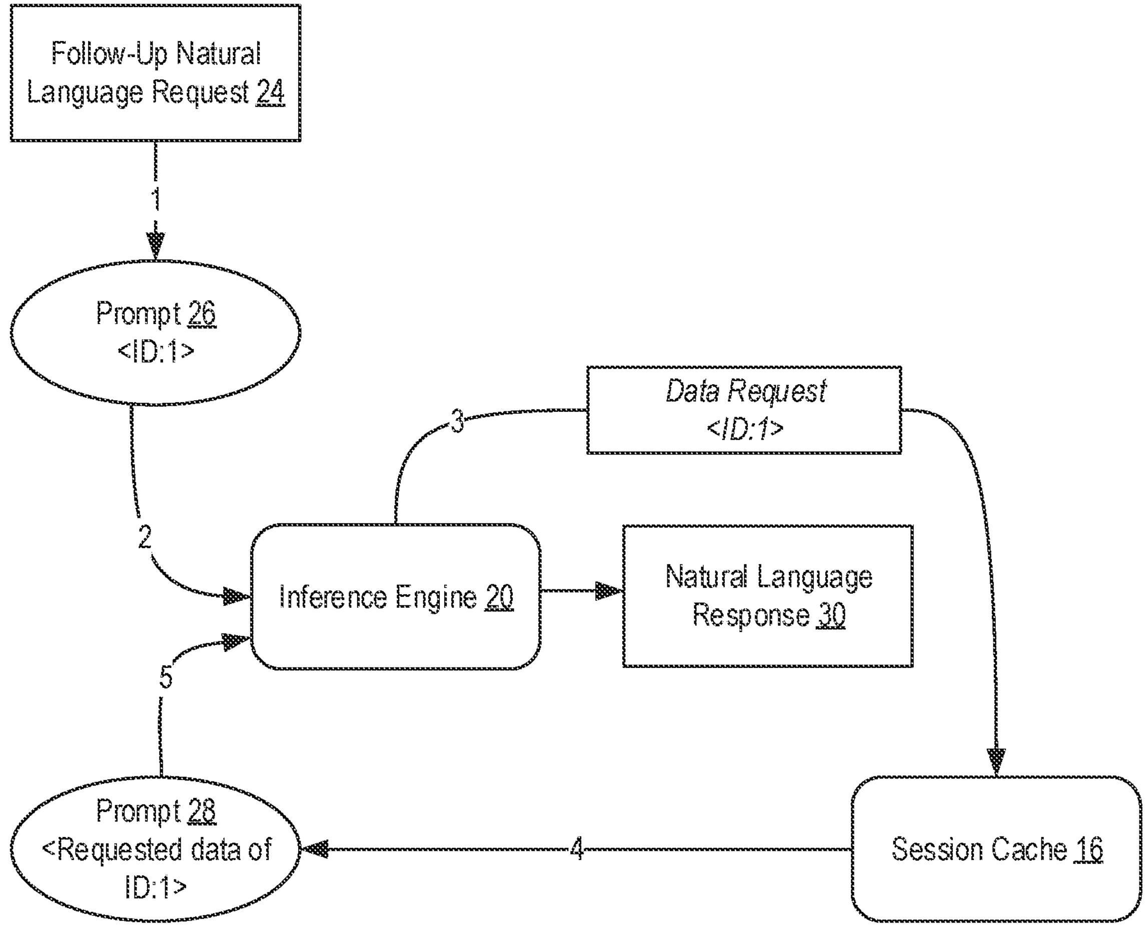
FIG. 2 depicts an example representation of leveraging identifier data in a recursive LM inference process which may be performed by the system of FIG. 1, according to various embodiments of the present disclosure.

Advantageously, the identifier data may be utilized for subsequent turns (e.g., for follow-up natural language requests and responses) in order to ensure consistency when referring to the entity while reducing and/or eliminating prompt bloat. As shown in FIG. 2, a follow-up natural language request 24 may be received. For example, the follow-up natural language request 24 may include another question that references Entity 1. Continuing with the example above, after receiving a natural language response answering the question "what is the latest album by [Country Music Singer A]?" the user may then ask (as a follow-up natural language request) "where is the next stop on her current tour?" Upon receiving the follow-up natural language request, the entity manager 12 may utilize coreference resolution and/or NER techniques to recognize the pronoun "her" is referring back to [Country Music Singer A]. As noted above, NER may be used to identify segments of named entities in text data and to categorize or tag the named entities into various predefined classes. In this example, NER may be used to identify and tag [Country Music Singer A] as a named entity of a type "person" in response to the initial natural language request 10. In response to the follow-up natural language request, the entity manager 12 may refer back to retained context of the conversation (e.g., the previous identification of [Country Music Singer A] as a named entity) and associate the pronoun "her" with [Country Music Singer A]. For instance, given the recent context of the conversation (and, for example, a lack of other named entities in the conversation), it may be determined that that the pronoun "her" prefers back to the NER-tagged entity [Country Music Singer A]. In addition to context analysis, a logical connection between the two natural language requests may be identified to map "her" to [Country Music Singer A] due to the established flow of the conversation (e.g., the follow-up natural language request immediately follows the initial natural language request). The question "where is the next stop on her current tour?" may then be reformulated (e.g., by entity manager 12) into a prompt 26 that includes the identifier data that maps to a location in the session cache 16 in which resolved entity data for Country Music Singer A. For instance, the prompt 26 may be "where is the next tour date for <id>1</id>?" In this manner, rather than resolving entity data for Country Music Singer A twice (through separate API calls to data sources 14) which may result in incorrect data being received the second time (e.g., data about another person by the same name as Country Music Singer A), the LM-based system may maintain the resolved entity data (e.g., in session cache 16) and refer to the data each time the entity is referenced. As shown in FIG. 2, the inference engine 20 may process the prompt and subsequently request (e.g., via an API call or the like) particular data from the session cache by passing the identifier data as an input parameter of the data request. In response, at least a portion of the structured metadata of the first resolved entity data may be returned from the session cache, which can be inserted into a new prompt 28 which the inference engine 20 can then process to produce a natural language response 30 to the follow-up natural language request 24.

Figure 3A:
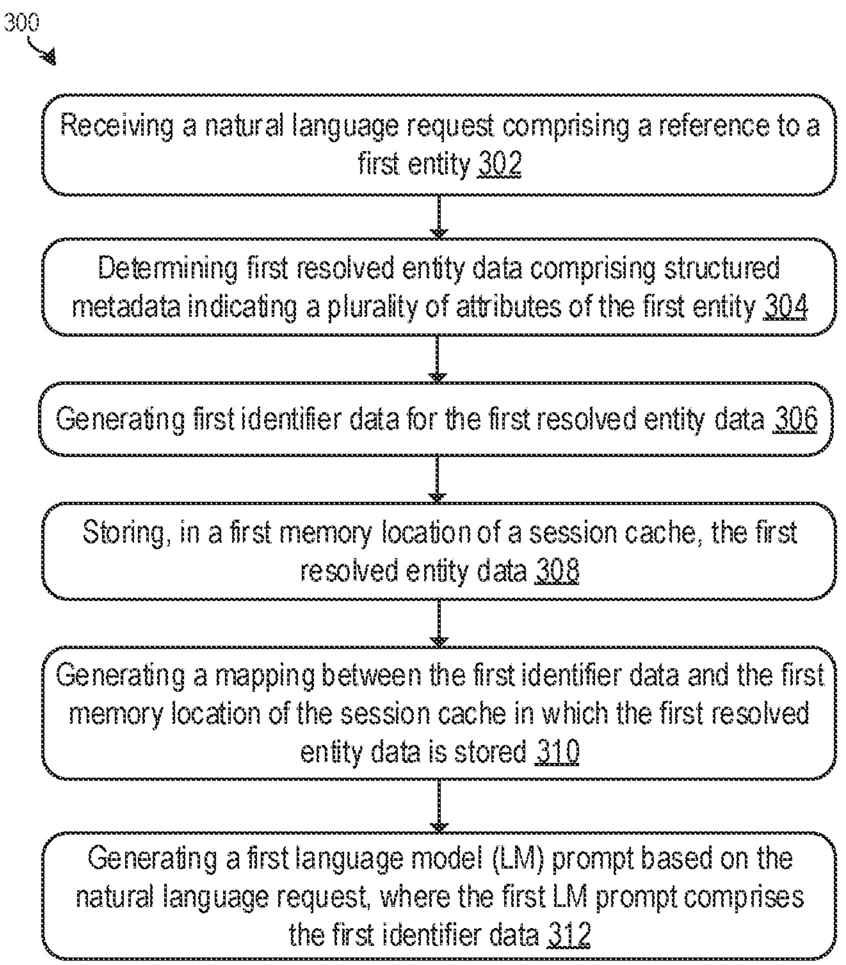
FIG. 3A depicts a process for performing entity management for an LM, in accordance with various aspects of the present disclosure.
Figure 3B:
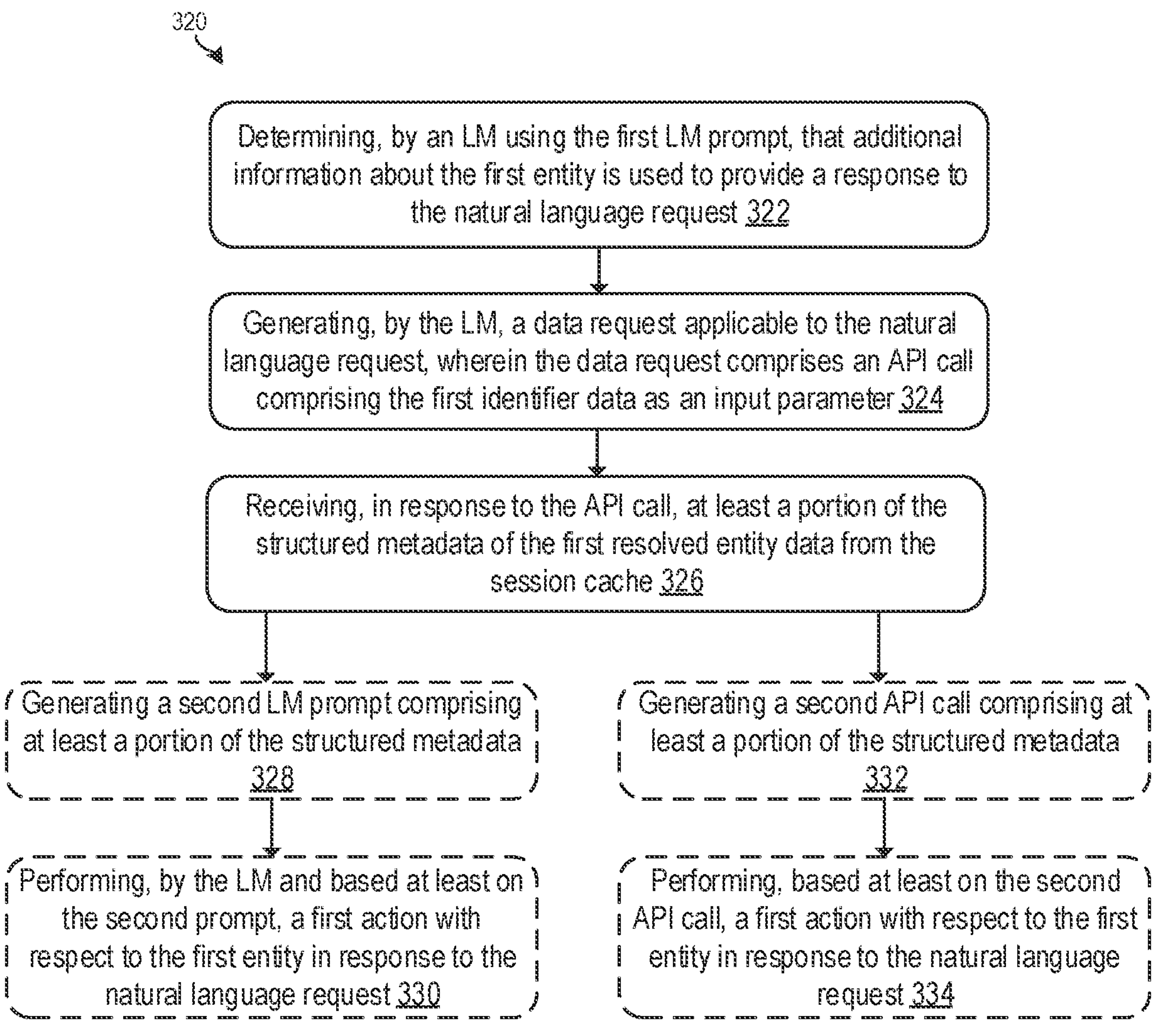
FIG. 3B depicts a process for performing entity management for an LM, in accordance with various aspects of the present disclosure.

FIGS. 3A and 3B are flow chart illustrating example processes 300 and 320 for entity management in LM-based processing, in accordance with embodiments of the present disclosure. The process 300 of FIG. 3A and process 320 of FIG. 3B may be executed by one or more computing devices. The actions of processes 300 and 320 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in processes 300 and 320 may be described herein with reference to elements of FIGS. 1-2 and 4-6. Although shown in a particular order, the steps of processes 300 and 320 may instead be performed in a different order. Additionally, various steps may be performed in parallel in various implementations. Further, some steps may be omitted and/or other steps may be added in accordance with the entity management techniques described herein.

Process 300 may begin at action 302, at which a natural language request comprising a reference to a first entity is received. In some embodiments, the natural language request may correspond to a text or tokenized representation of a user input. In some examples, a user may enter text (e.g., via a user device) which is then received as a natural language request. In other examples, the user input may be spoken by the user and comprise audio data. For example, prior to receiving the natural language request, another component (e.g., an ASR component) may receive audio data representing the user input and process the audio data to determine a text or tokenized representation of a user input. In some examples, the natural language request may comprise a query or question asked by a user. In some examples, the natural language request may comprise a command to perform some action. The natural language request may reference a first entity by including a mention of the first entity in the request. For example, a user may enter the command "play [Song Title]," with [Song Title] being the first entity referenced in the natural language request.

Processing may continue at action 304, at which first resolved entity data is determined. In some embodiments, the first entity referenced in the natural language request may be identified and first resolved entity data may be received for the first entity. To do so, ER and/or NER techniques (as discussed above) may be performed to identify a first entity referenced in the natural language request (and/or identify subsequent references to the first entity in any preceding natural language requests). For example, NER may involve identifying and classifying (or tagging) entities referenced in text using one or more machine learning models (e.g., BERT or other deep learning models) trained using labeled data to recognize entities (such as people, places, organizations, locations, etc.). Once the first entity is identified, it may be categorized (e.g., "Nebraska" may be tagged as a "location,") to assist in coreference resolution (e.g., identifying expressions (e.g., pronouns or nominal phrases) that refer to the same entity in text) and/or disambiguation of entities in ER (as discussed above). In some examples, an API call (that includes the first entity as an input parameter) may be executed to retrieve first resolved entity data for the first entity from one or more data sources (e.g., internal or external data sources). As discussed above with reference to FIG. 1, the first resolved entity data may comprise structured metadata indicating a plurality of attributes of the first entity.

Processing may continue at action 306, at which first identifier data is generated for the first resolved entity data. In some embodiments, the first identifier data may comprise an identifier, such as an integer value, alphanumeric code or the like that uniquely identifies the resolved entity data from other resolved entity data previously or subsequently received.

Processing may continue at action 308, at which the first resolved entity data is stored in a first memory location of a session cache. As described above, the session cache may comprise a location (e.g., a logical address) or series of locations in memory (e.g., a memory of a remote device as discussed below in connection with FIG. 5) in which resolved entity data may be stored for a particular communication session. It should be noted that in some embodiments, storage of the first resolved entity data may occur before generation of identifier data for the first resolved entity data. In this manner, for example, rather than generating a separate value to represent the first resolved entity data, the system may assign an actual memory address (e.g., in hexadecimal notation) as first identifier data for the first resolved entity data. In this regard, the first identifier data may reference a memory location of the session cache in which the first resolved entity data is stored.

In some embodiments, the session cache may comprise a dedicated space in memory in which multiple instances of resolved entity data are stored for a specific communication session that involves a user conversing with a local network-connected device (e.g., as described below in connection with FIG. 4). For example, additional natural language requests that reference additional entities may be received during the communication session. In such an example, the system may determine second resolved entity data, generate second identifier data associated with the second resolved entity data, and store, in the session cache, the second resolved entity data in association with the second identifier data. In some examples, a memory (e.g., memory 596) may comprise a plurality of session caches, each session cache associated with a respective communication session associated with a respective network-connected device (e.g., a voice assistant device or the like).

Processing may continue at action 310, at which a mapping is generated between the first identifier data and the first memory location of the session cache in which the first resolved entity data is stored. The mapping may be indicated in a data structure which can be referenced by the system (or other systems) when accessing or retrieving data and/or performing other processes in connection with the first resolved entity data.

Processing may continue at action 312, at which a first language model (LM) prompt is generated based on the natural language request. The first LM prompt may comprise the first identifier data. Continuing with the above example, for a natural language request "play [Song Title]," a prompt "play <id>1</id>" may be generated, where 1 is the identifier data assigned to the resolved entity data for [Song Title]. In this manner, by first storing resolved entity data and generating a prompt that includes identifier data which points to the stored resolved entity data (rather than inserting the first resolved entity data (that includes a large amount of metadata describing the first entity) directly into the prompt, LM hallucination and/or similar issues that may occur as a result of prompt bloat are avoided. Further, if asked a follow-up question (e.g., a second natural language request) that references the first entity, the system may again provide the identifier data to the LM via a prompt, rather than resolving the entity data again through data sources (which may result in receiving incorrect information pertaining to a different entity altogether).

In some embodiments, an LM may infer (based on the first LM prompt) that more information about the entity is needed to effectively respond to the natural language request. As shown in FIG. 3B, a process 320 may be performed as a continuation of process 300. Process 320 may begin at action 322, at which the LM determines, using the first LM prompt, that additional information about the first entity is used to provide a response to the natural language request.

Processing may continue at action 324, at which the LM generates a data request applicable to the natural language request. In some embodiments, the data request comprises an API call comprising the first identifier data as an input parameter. In this regard, the LM may call a function using the first identifier data in order to receive the first resolved entity data (or a portion thereof) from the session cache.

Processing may continue at action 326, at which at least a portion of the structured metadata of the first resolved entity data from the session cache is received in response to the API call. For example, if asked "what is the latest album by [Songwriter A]?" the data request comprise an API call to retrieve the release dates for all albums by <id>1</id> and the portion of the structured metadata of the first resolved entity data that is received may include data about the albums including release dates by [Songwriter A]. In some embodiments, as shown in FIG. 3B, depending on the nature of the natural language request, different actions may be performed in response to receiving at least the portion of the structured metadata of the first resolved entity data from the session cache. In the above example in which a user asks a question expecting a natural language response, processing may continue to actions 328 and 330, wherein a second LM prompt is generated in order for the LM to output a response using the second LM prompt.

In this regard, in some embodiments, processing may continue at action 328, at which a second LM prompt comprising at least a portion of the structured metadata is generated. For example, a second prompt may include the album titles and corresponding release dates for [Songwriter A] retrieved from the stored resolved entity data in the session cache.

Processing may continue at action 330, at which the LM performs, based at least on the second prompt, a first action with respect to the first entity in response to the natural language request. In some embodiments, performing the first action may comprise generating, using the second LM prompt, and outputting a first natural language response to the first natural language request. For example, the first natural language response may provide information about the first entity according to at least the portion of the structured metadata received in response to the data request. For example, the natural language response may provide an answer to a user's question indicated by the original natural language request. Continuing with the above example, the natural language response may include the title of the latest album by [Songwriter A] as well as its release date.

In some embodiments, for example where a natural language request comprises a command to take some action with respect to a device, media article, or the like, processing may continue to actions 332 and 334, wherein a second API call is generated in order to perform a requested action. For example, in addition to or alternatively to generating and outputting a natural language response, performing the first action may comprise other actions, such as playing, stopping, pausing, or otherwise controlling an article of media (e.g., a song, movie, television program, or the like) as requested by the original natural language request, activating another device as requested by the natural language request (e.g., turning on or turning off a light, camera, appliance, etc.) or another action capable of being performed by the network-connected device. In this regard, in some embodiments, processing may continue at operation 332, wherein a second API call is generated that comprises at least a portion of the structured metadata. For example, in response to a natural language request where a user states "play the [Popular Movie] theme song," an API call may be generated (after having stored and assigned identifier data (e.g., <id>1</id>) to resolved entity data for the [Popular Movie] theme song) to play the song, such as [API].play (id: 1). Processing may continue at operation 334, wherein a first action is performed with respect to the first entity in response to the natural language request based on the second API call. In this regard, the API call may be used to perform the action (e.g., play a song or the like), while structured metadata about the entity is still retained in the session cache such that future natural language requests referring to the entity can be efficiently and effectively processed using the resolved entity data.

In some examples, during a communication session in which the first natural language request was received (as described above in connection with action 302 of FIG. 3A), a second natural language request comprising a second reference to the first entity may be received, as shown in the following example:

User input designator: (first natural language request) play [song title]

(Entity Resolution function call ("[song title]", type="music") Observe: [song title]<id>1</id>

Prompt: play <id>1</id>

The session cache now has resolved entity data including metadata indicating attributes of the music track including, for example, a catalog-based identifier, UAC Id if available, with a mapped identifier (1) which is valid during the communication session. The chat history is supplemented with identifier tags which includes the identifier data. Answer (natural language response): playing ghostbuster theme song on your speakers

[API].play (id: 1)

The called play function may retrieve the full entity by using ID=1 and, for example, schedule it to play with a music player.

User input designator: (second natural language request) when was it released?

Prompt: when was <id>1</id> released?

[API].retrieve ("when was <id>1</id> released?")

The LM is able to reference "it" to <id>1</id>, and use the retrieve function to retrieve resolved entity data using the ID=1.

As shown above, the system may determine the second reference corresponds to the first entity, generates another prompt based on the second natural language request that comprises the first identifier data (e.g., "when was <id>1</id> released?"). In some embodiments, the first identifier data may be temporally associated with the first resolved entity data during a first communication session that includes the first natural language request. In this regard, resolved entity data may only be stored in the session cache for a limited time (e.g., the duration of the communication session) and deleted afterwards to utilize the memory space for other resolved entity data (e.g., for other future communication sessions). In some embodiments, in response to a conclusion of the first communication session, the mapping between the first identifier data and the first memory location of the session cache may be deleted. Additionally, in some embodiments, the first resolved entity data may be deleted from the session cache. In some embodiments, a communication session may conclude in response to a timeout or similar mechanism. In this regard, an amount of time that has elapsed since a time at which a most recent language request was received may be compared with a timeout threshold to determine whether the amount of time exceeds the timeout threshold. For example, if a predefined period of time elapses since the time at which a last natural language request was received, a timeout of the communication session may occur and resolved entity data stored in the session cache associated with the communication session may be deleted. The session cache may then be re-used for another communication session. For example, during a second communication session, a second natural language request comprising a reference to a second entity may be received. In response, second resolved entity data comprising structured metadata indicating a plurality of attributes of the second entity may be determined. Second identifier data for the second resolved entity data may be generated, the second resolved entity data may be stored in the first memory location of the session cache, and a mapping between the second identifier data and the first memory location of the session cache in which the first resolved entity data is stored may be generated.

Ranking, Pruning, and Disambiguation

In some embodiments, an LM may leverage identifier data when calling certain functions to attempt to rank or disambiguate resolved entity data when multiple instances of resolved entity data are stored. Prompting a list of entities with all their attributes to the LM is not practical due to prompt size limitations and because doing so may confuse the LM. To solve this problem, an LM-based system may utilize identifier data in connection with functions to rank and disambiguate resolved entity data. These functions may comprise backend functions which may be accessible via one or more APIs (e.g., a ranking API).

In some examples, an LM may cause execution of a rank function to sort and filter resolved entity data based on context data or natural language instructions, as shown in the following example:

rank (list of identifiers, instruction or context);

In this regard, a ranking request applicable to the natural language request may be generated that comprises first identifier data and second identifier data as input parameters. In response to executing the ranking request, a ranked entity identifier list may be received that comprises a plurality of identifier data including at least the first identifier data and the second identifier data. In some embodiments, context data (e.g., conversation history of the current communication session) may also be passed to assist in the ranking. For example, given a list of identifiers corresponding to resolved entity data associated with different recipes, the ranking function may select an identifier corresponding to resolved entity data about a vegan recipe based on the chat history (indicating that the user follows a vegan diet) and attributes of the resolved entity data.

In some embodiments, the first action (e.g., as discussed above in connection with action 330 of FIG. 3B) is performed in accordance with the ranked entity identifier list. For example, a highest-ranked identifier may be used to retrieve additional data about the resolved entity data that corresponds to the highest-ranked identifier and output a natural language response accordingly. In some embodiments, rather than returning a ranked entity identifier list, the ranking function may generate the ranked entity identifier list and only return a selected one of the identifiers which were ranked (e.g., a highest-ranked identifier). In this regard, the ranking function may be a pruning function which prunes other identifiers from the ranked entity identifier list apart from the highest-ranked identifier (e.g., to minimize data inserted into a prompt for the LM which comprises the results of the rank function). In some examples, the ranking function and/or pruning function may utilize one or more machine learning techniques to rank the resolved entity data (as corresponding to the list of identifiers passed to the ranking function as an input parameter) based on, for example, context data (e.g., conversation history). For example, the ranking function and/or pruning function may utilize a context-aware model (trained on contextual information) with word or entity embeddings, models with attention mechanisms (e.g., transformer-based architectures), and/or a recurrent neural network (RNN) to rank the resolved entity data based on context data.

In some examples, an LM may cause execution of a disambiguate function to select an identifier from a plurality of identifiers or generate a follow-up question (e.g., to a natural language request) to narrow down the list of identifiers based on context data or natural language instructions, as shown in the following example:

disambiguate (list of identifiers, instruction or context);

In this regard, a disambiguation request applicable to the natural language request may be generated that comprises the first identifier data and the second identifier data as input parameters. In response to executing the disambiguate request, a selected one of the first identifier data or the second identifier data may be received, or alternatively, a natural language response (i.e., a follow up question) comprising a reference to at least one of the first resolved entity data or the second resolved entity data may be received. The LM may then output the natural language response and receive, in response to the natural language response, a second natural language request comprising a selection corresponding to one of the first resolved entity data or the second resolved entity data. The LM may use the second natural language request to then generate an LM prompt comprising identifier data corresponding to the selection. For example, given a list of entities from both music and video domains, the disambiguate request may be utilized to generate a question asking the user to select between music tracks or videos.

Figure 4:
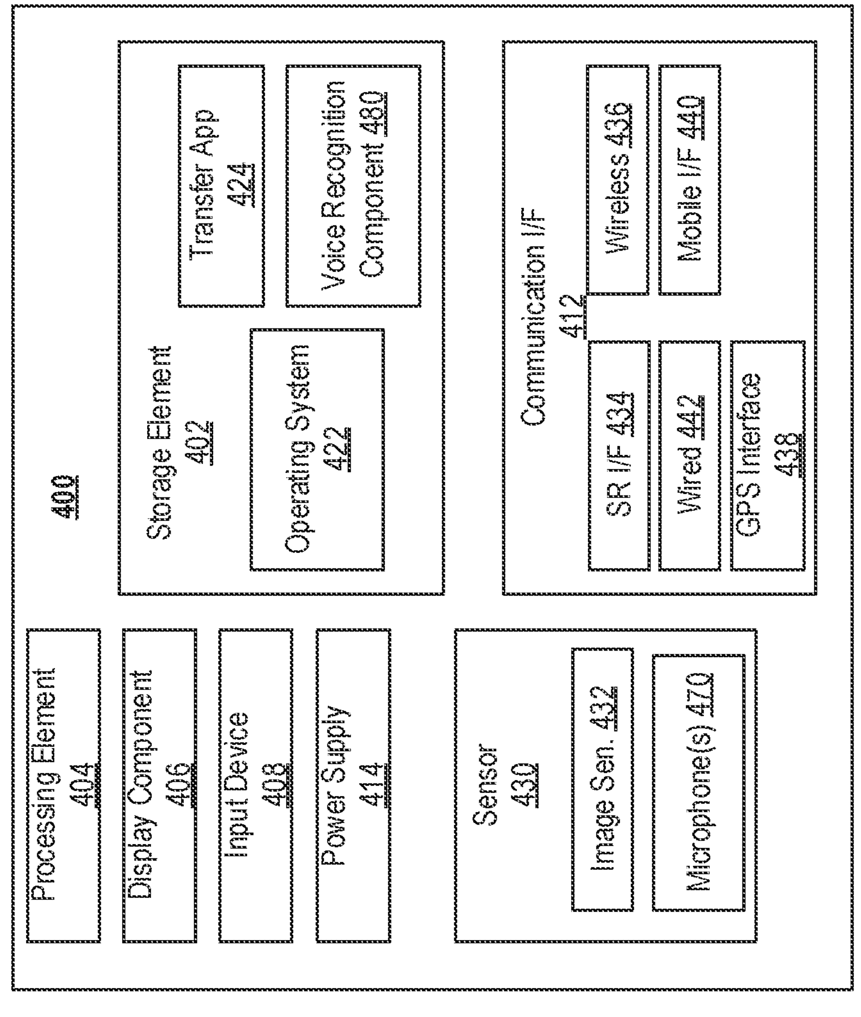
FIG. 4 is a block diagram showing an example architecture of a network-connected device that may be used in accordance with various embodiments described herein.

FIG. 4 is a block diagram showing an example architecture 400 of a network-connected device (e.g., a local network-connected device such as a natural language processing-enabled device or another input device) that may be used to implement, at least in part, a voice assistant and/or other speech processing functionality configured to receive spoken and/or other natural input commands (e.g., natural language requests), in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise one or more components of the system 100 for entity management.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a “wakeword” to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
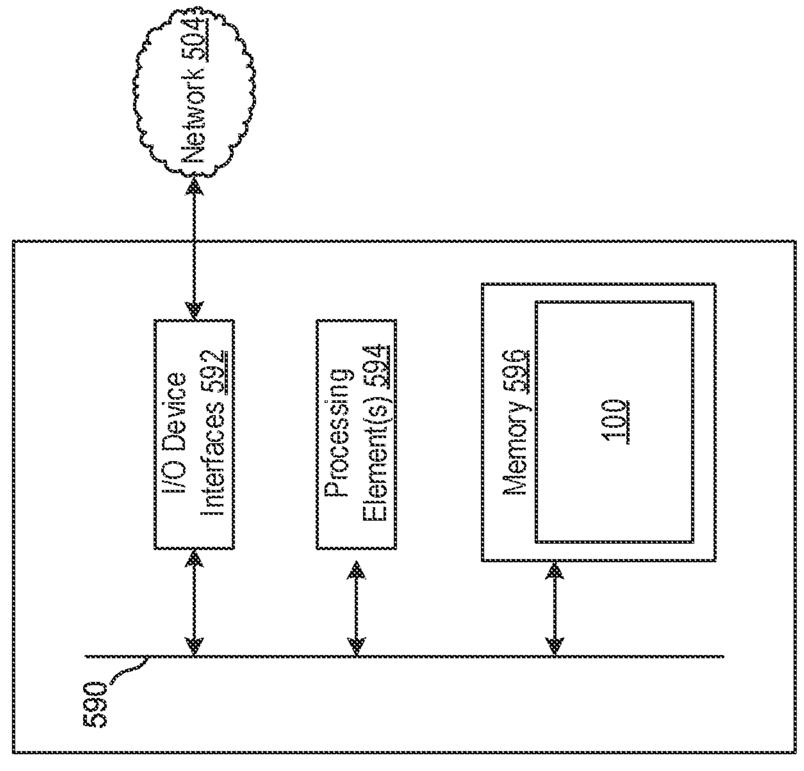
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system and/or command processing. For example, the various components of FIG. 5 may be used to implement the system 100 for entity management. Multiple computing devices may be included in the system, such as one speech processing computing device for performing ASR processing, one speech processing computing device for performing natural language processing, one or more skill computing device(s) implementing skills, an LM-based speech processing system, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, resolved entity data. In some examples, memory 596 may store machine learning models of an inference engine (discussed below in connection with FIG. 6), such as machine learned models associated with various multi-head attention modules (described above in reference to FIG. 1), when loaded from memory 596. In various further examples, memory 596 may be effective to store instructions effective to program controllers/processors 594 to perform the various techniques described above in reference to FIGS. 1-3. Accordingly, in FIG. 5, the system 100 for entity management is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of a natural language processing system may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of the various computing devices described herein may include input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

FIG. 6 depicts an example LM-based natural language processing flow (which may be an example LM architecture, in accordance with various aspects of the present disclosure). In various examples, the entity manager 12 (discussed above in connection with FIG. 1) may comprise some or all of the elements shown in FIG. 6 and may be used to resolve entities and store data for the resolved entities in association with identifier data that may then be provided to an inference engine 660 (e.g., an LM such as an LLM) of FIG. 6 as part of the prompt (e.g., as context data). The example architecture in FIG. 6 includes an LM orchestrator 630 and various other components for determining an action responsive to a user input. The architecture may further include an action plan execution component 680 and an API provider component 690. With reference to FIG. 6, the LM orchestrator 630 may include a preliminary action plan generation component 640, a prompt generation component 650, an inference engine 660, and an action plan generation component 670. The inference engine 660 may take various modalities as input such as text, images, audio, video, binary formats (e.g., spreadsheets),.pdf, source code, etc.

In some examples, the inference engine 660 may be a transformer-based seq2seq model involving an encoder-decoder architecture. In some such embodiments, the inference engine 660 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the inference engine 660 may be pre-trained with approximately 1 trillion tokens. Being trained on CLM tasks, the inference engine 660 may be capable of in-context learning (an example of such being Alexa Teacher Model (Alexa™).

In various examples, the input to the inference engine 660 may be in the form of a prompt. A prompt may be a natural language input, for example, an instruction, for the inference engine 660 (e.g., an LM) to generate an output according to the prompt. The output generated by the inference engine 660 may be a natural language output responsive to the prompt. The prompt and the output may be text in a particular spoken language. For example, for an example prompt "how do I cook beans?", the inference engine 660 may output a recipe (e.g., a step-by-step process) to cook beans. As another example, for an example prompt "I am hungry. What restaurants in the area are open?", the inference engine 660 may output a list of restaurants near the user that are open at the current time. As discussed above, in some embodiments, a prompt may also include identifier data that maps to resolved entity data stored in a session cache.

The inference engine 660 may be configured using various learning techniques. For example, in some embodiments, the inference engine 660 may be configured (e.g., "fine tuned") using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the inference engine 660 may be configured using one-shot learning, which is similar to few-shot learning, except the model is provided with a single example. As another example, in some embodiments, the inference engine 660 may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

The entity manager 12 of the LM orchestrator 630 may be configured for generating the prompt to be used by the inference engine 660 to determine an action responsive to a user input, as well as assigning identifier data (e.g., temporal identifiers) to resolved entity data, as described above. As shown in FIG. 6, the LM orchestrator 630 receives (at step 1) user input data 627. In some instances, the user input data 627 may correspond to a text or tokenized representation of a user input (e.g., a natural language request as discussed above). For example, in some embodiments, prior to the LM orchestrator 630 receiving the user input data 627, another component (e.g., an ASR component) may receive audio data representing the user input. The ASR component may perform ASR processing on the audio data to determine ASR output data (e.g., text data) corresponding to the user input. For example, the ASR component may determine ASR data that includes an ASR N-best list including multiple ASR hypotheses and corresponding confidence scores representing what the user may have said. The ASR hypotheses may include text data, token data, etc. as representing the input utterance. The confidence score of each ASR hypothesis may indicate the ASR component's level of confidence that the corresponding hypothesis represents what the user said. The ASR component may also determine token scores corresponding to each token/word of the ASR hypothesis, where the token score indicates the ASR component's level of confidence that the respective token/word was spoken by the user. The token scores may be identified as an entity score when the corresponding token relates to an entity. In some instances, the user input data 627 may include a top scoring ASR hypothesis of the ASR data. In addition, entity data recognized using the system 100 may be provided as part of the input data 627.

As illustrated in FIG. 6, the user input data 627 may be received at the preliminary action plan generation component 640 and the prompt generation component 650 of the LM orchestrator 630. The preliminary action plan generation component 640 processes the user input data 627 to generate prompt generation action plan data 645 corresponding to an instruction(s) (e.g., a request(s)) for one or more portions of data usable to generate a language model prompt for determining an action responsive to the user input). In some examples, the one or more portions of data may be data that is determined to be relevant for processing of the user input. The one or more portions of data may represent one or more actions (e.g., API definitions), one or more exemplars corresponding to the actions (e.g., example model outputs including an appropriate use of the API), one or more device states corresponding to one or more devices associated with the user input, and/or one or more other contexts associated with the user input. For example, if the user input data 627 represents a user input of "please turn on the kitchen lights every morning at 7 am," then the preliminary action plan generation component 640 may determine prompt generation action plan data 645 representing instructions for one or more actions (e.g., API definitions) related to turning on the kitchens lights every morning, one or more exemplars corresponding to the related actions, one or more device states corresponding to one or more devices associated with the "kitchen lights", and one or more other contexts. For further example, if the user input data 627 represents a user input of "What is the elevation of Mt. Everest," then the preliminary action plan generation component 640 may determine prompt generation action plan data 645 representing instructions for one or more actions (e.g., API definitions, specifications, schemas) related to the user input and one or more exemplars corresponding to the related actions, as other information, such as devices states or other contextual information (user profile information, device profile information, weather, time of day, historical interaction history) may not be relevant.

In some examples, the prompt generation action plan data 645 may include one or more executable API calls usable for retrieving the one or more portions of data from the corresponding component. For example, instructions included in the prompt generation action plan data 645 may include "FETCH_API," "FETCH EXEMPLAR," "FETCH DEVICE_STATE," "FETCH_CONTEXT," etc., along with optional API arguments/inputs. In some embodiments, the prompt generation action plan data 645 may also include the user input data 627. The prompt generation action plan data 645 may be sent (at step 2) to the action plan execution component 680.

In some examples, the preliminary action plan generation component 640 may be configured to process the user input data 627 to determine a representation of the user's request. In various examples, the representation of the user's request may be a reformulation of the user's request. For example, the if the user input data 627 represents a user input of "I have always wanted to travel to Japan, I have heard it's beautiful. How tall is Mt. Fuji?", then the preliminary action plan generation component 640 may determine the representation of the user's request as being "How tall is Mt. Fuji," or the like. The preliminary action plan generation component 640 may generate the prompt generation action plan data 645 using the determined representation of the user's request. In this regard, the entity manager 12 may direct the preliminary action plan generation component 640 to perform entity resolution (ER) processes in order to determine entities referenced by the user input data. Continuing with the example above, the preliminary action plan generation component 640 may identify entities including "Mt. Fuji" and "Japan."

In some examples, the preliminary action plan generation component 640 may implement one or more machine learning (ML) models. A first ML model(s) may be configured to take as input the user input data 627 and generate a representation of the user's request. For example, the ML model may be a text summarization model or a text rewrite model. A second ML model (or the first ML model) may be configured to take as input the representation of the user's request (or the user input data 627) and determine the one or more portions of data relevant for processing of the user input. For example, the second ML model may be a classifier trained to classify the user's request (or the user input data 627) to determine data (or types of data) relevant to the processing of the user input (e.g., one or more related actions (e.g., API definitions), one or more exemplars corresponding to the one or more related actions, one or more device states corresponding to one or more related devices, one or more related contexts, etc.)

In other embodiments, the preliminary action plan generation component 640 may be an LM, similar to the inference engine 660. In such embodiments, the architecture may include a further component configured to generate a prompt to be provided to the LM (e.g., similar to the prompt generation component 650) or the prompt may be generated by the prompt generation component 650. The component may generate a prompt (e.g., according to a template) including the user input data 627 and instructions to determine the one or more portions of data (or types of data) relevant to the processing of the user input. The LM may process the prompt and generate model output data representing the one or more portions of data (or types of data). The preliminary action plan generation component 640 may process the model output data to determine the prompt generation action plan data 645.

The action plan execution component 680 may process the prompt generation action plan data 645 to execute the one or more instructions to retrieve/receive data corresponding to the user input and that may be used to generate the language model prompt. As described above, in some examples, the system 100 may be used to retrieve and store resolved entity data in association with identifier data. The identifier data can then be inserted into the prompt for LM inference in an effort to avoid overloading the prompt with excessive information (e.g., the resolved entity data itself, portions of which may be irrelevant to answering the natural language request). Insertion of identifier data into a prompt thus improves LM inference and subsequent responses by mitigating LM hallucinations or similar issues that may occur as a result of prompt bloat. As shown in FIG. 6, the action plan execution component 680 processes the prompt generation action plan data 645 to generate action data 685 representing an action included in the prompt generation action plan data 645 (e.g., a single instruction, such as FETCH_CONTEXT). For example, in the situation where the action is represented by an API call, the action data 685 may represent the action plan execution component 680 executing the API call included in the prompt generation action plan data 645. In some examples, an API call may include (as an input parameter) an entity for which data (e.g., resolved entity data) is to be retrieved. The action data 685 may be sent (at step 3) to the API provider component 690. In the situation where the prompt generation action plan data 645 includes more than one instruction, the action plan execution component 680 may generate more than one instance of action data 685 (e.g., one instance for each instruction included in the prompt generation action plan data 645) and send each instance to the API provider component 690.

The API provider component 690 may process the (one or more instances of the) action data 685 and cause the retrieval of the (one or more portions of) data associated with the action data 685. The API provider component 690 may include a knowledge provider component. The knowledge provider component may include an API retrieval component, an exemplar retrieval component, a device state retrieval component, and an "other" context retrieval component. The knowledge provider component may provide the action data 685 to the component(s) configured to determine the data corresponding to the request(s) represented by the action data 685.

For example, the API retrieval component (not shown) may process the action data 685 to generate API data 692 representing one or more APIs that correspond to an action performable with respect to the user input. For example, if the user input corresponds to "turn on the kitchen light," the API retrieval component may determine an API usable to control a device and include an API definition corresponding to the API in the API data 692. In some embodiments, the API definition may include one or more API call frameworks for instructing/requesting that the API perform an action (e.g., turn_on_device (device: [device name]), turn_off_device (device: [device name]), set_device_temperature (device: [device name]); temperature: [temperature], set_device_volume (device: [device name]; volume: [volume value]), etc.). In some embodiments, the API definition may include a natural language description of the functionality of the API (e.g., a natural language description of the actions performable by the API/API call framework). For example, for the abovementioned API determined to be associated with the user input of "turn on the kitchen light," the API definition may further include a natural language description of "used to power on a device." In some embodiments, the one or more API definitions may be included in the API data 692 based on them being semantically similar to the user input. For example, the API retrieval component may be capable of comparing (e.g., using cosine similarity) (an encoded representation of) the user input to (an encoded representation of) the API definition to determine a semantic similarity between the user input and the API definition (e.g., a semantic similarity between the user input and the natural language description of the functionality of the API included in the API definition). If the API definition is determined to be semantically similar to the user input, then the corresponding API definition may be included in the API data 692. In some embodiments, the API retrieval component may include the top-n identified API definitions in the API data 692. The API data 692 may be sent (at step 4) to the action plan execution component 680 as shown in FIG. 6.

For further example, the exemplar retrieval component may process the action data 685 to generate exemplar data 694 representing one or more exemplars associated with one or more APIs (e.g., the API represented by the API data 692). As used herein, an "exemplar" associated with an API corresponds to an example use of the API (e.g., an example language model output including use of the API (e.g., via a corresponding API call) with respect to a user input, where the user input is similar to the current user input. For example, for an API associated with the API call framework "turn_on_device (device: [device name])," and the current user input "please turn on the kitchen lights" the exemplar retrieval component may select an exemplar including the example user input of "please turn on the lights" and the API call of "turn_on_device (device="lights")." In some embodiments, an exemplar represented in the exemplar data 694 may include an example user input, a natural language description of an action associated with the example user input, an executable API call associated with the example user input and the action associated with the example user input, an example result of the API call, a natural language description of an action to be performed in response to the example result of the API call, and/or an output responsive to the user input. For example, for an API associated with the API call frameworks "Routine.create_turn_on_action (device: str)" and "Routine.create_time_trigger (hour: [hour value])" and the current user input "please turn on the kitchen light everyday at 7 am," the exemplar retrieval component may select an exemplar representing:

{
Customer: turn on the kitchen light everyday at 7 am
Thought: the customer is trying to create a routine
Action:
Routine.create_routine (trigger-Routine.create_time_trigger (hour=7), action=Routine.create_turn_on_action (device="kitchen light"))
Observation: routine created successfully
Thought: time to respond
Response: I have created a routine for you. Anything else?
}

Although not illustrated in FIG. 6, in some embodiments, the API provider component 690 and/or a knowledge provider component may provide the exemplar retrieval component with the action data 685 and a list of API call(s) to which the determined exemplars are to be associated (e.g., the API call(s) included in the API data 692). In some embodiments, the one or more exemplars may be included in the exemplar data 694 based on them being semantically similar to the user input. For example, the exemplar retrieval component may be capable of comparing (e.g., using cosine similarity) the current user input to the example user input included in an exemplar to determine a semantic similarity between the current user input and the example user input. If the example user input is determined to be semantically similar to the current user input, then the corresponding exemplar may be included in the exemplar data 694. In some embodiments, the exemplar retrieval component may include the top-n identified exemplars in the exemplar data 694. The exemplar data 694 may be sent (at step 4) to the action plan execution component 680 as shown in FIG. 6.

As another example, a device state retrieval component (not shown in FIG. 6) may process the action data 685 to generate device state data 696 representing one or more states of one or more devices associated with/relevant to the user input (e.g., whether the device is powered on or off, a volume level associated with the device, etc.). For example, if the user input corresponds to "Please turn on the kitchen light," the device state data 696 may represent the state(s) of one or more devices that are associated with a functionality of turning on a light, are associated with the kitchen, are associated with a user profile of a user who provided the user input, etc. In some embodiments, the device(s) may be determined to be relevant based on a device location(s). For example, devices (e.g., microwave, oven, fridge, smart speaker, etc.) near the user device (e.g., located in the kitchen) that received the user input may be used to determine the device state data 696. In some embodiments, the one or more devices may be determined to be relevant to the user input based on device profile information. For example, the device state retrieval component may be capable of comparing device profile information for a device (e.g., device ID, device group ID, a location associated with the device, etc.) to the user input to determine whether the device is relevant to the user input. In some embodiments, the device state retrieval component may include the top-n identified device states in the device state data 696. The device state data 696 may be sent (at step 4) to the action plan execution component 680 as shown in FIG. 6.

As a further example, a context retrieval component (not shown) may process the action data 685 to generate other context data 48 (apart from the device state data 696, the API data 692, the exemplar data 694, etc.) representing one or more contexts associated with/relevant to the user input. For example, the other context data 48 may represent user profile information (age, gender, associated devices, user preferences, etc.), visual context (e.g., content being displayed by devices associated with the user profile, content being displayed by the user device that captured the user input, etc.), knowledge context (e.g., one or more previous user inputs and/or system generated responses, etc.), time of day, geographic/device location, weather information, etc. In some embodiments, the other context retrieval component may include the top-n identified context in the other context data 48. The other context data 48 may be sent (at step 4) to the action plan execution component 680 as shown in FIG. 6.

In some embodiments, the knowledge provider component may be configured to cause one or more of the API retrieval components, the exemplar retrieval component, the device state retrieval component, and the other context retrieval component to process based on the data output by one or more of the components of the knowledge provider component. For example, if the output of the API retrieval component (e.g., the API data 692) indicates that a related API definition was identified, then the knowledge provider component (or another component) may cause the exemplar retrieval component to process to determine one or more exemplars related to the identified API definitions. For further example, if the output of the API retrieval component (e.g., the API data 692) indicates that a particular API definition was identified (e.g., an API definition for controlling a device), then the knowledge provider component may cause the exemplar retrieval component to process as described above, and may further cause the device state retrieval component and/or the other context retrieval component to process to determine device states for one or more related devices and/or other contextual information based on the identified API definition being associated with controlling a device. In some embodiments, the knowledge provider component may determine to cause the components to process based on instruction(s) included in the action data (e.g., based on a determination made by preliminary action plan generation component 640, as discussed above).

The action plan execution component 680 may send (step 5) the data received from the API provider component 690 (e.g., the API data 692, the exemplar data 694, the device state data 696, and the other context data 48) to the prompt generation component 650. The prompt generation component 650 may be configured to generate prompt data 655 (e.g., using the user input data 627, the API data 692, the exemplar data 694, the device state data 696, and/or the other context data 48) to be used by the inference engine 660.

As discussed above, in some examples, resolved entity data (e.g., of API data 692) may be assigned an identifier (i.e., identifier data) and stored in a session cache (e.g., in memory 596) by entity manager 12. In this regard, the data sent to the prompt generation component 650 by the action plan execution component 680 may also comprise data from the entity manager 12, including identifier data corresponding to the resolved entity data.

In some examples, the prompt generation component 650 may generate the prompt data 655 representing a prompt for input to the inference engine 660. In some embodiments, such prompt data 655 may be generated based on combining the user input data 627, the API data 692, the exemplar data 694, the device state data 696, and the other context data 48. In some embodiments, as discussed above, generation of the prompt data 655 may include the prompt generation component 650 inserting identifier data corresponding to resolved entity data stored in the session cache into the prompt data. The prompt data 655 may be an instruction to determine an action(s) responsive to the user input data 627 given the other information (e.g., the API data 692, the exemplar data 694, the device state data 696, the other context data 48) included in the prompt data 655. In some embodiments, the prompt generation component 650 may also include in the prompt data 655 a sample processing format to be used by the inference engine 660 when processing the prompt and generating the response. In some embodiments, the prompt data 655 may be generated according to a template format. For example, the prompt data 655 may adhere to a template format of:

{
You have access to the following API's:
[API(s) (e.g., the API data 192)]
Use the following format:
User: the input utterance of a user
Thought: optionally think about what to do
Action: take an action by calling APIs
Observation: what the API execution returns
. . . (this thought/action/action input/observation can repeat N times)
Thought: done
Response: the proper response to the user (end of turn)
Examples
[Exemplar(s) (e.g., the exemplar data 694)]
Context: [device state(s) (e.g., the device state data 696)] [other
context(s) (e.g., the other context data 48)]
User: [the user input (e.g., the user input data 627)]
}

In some examples, the template format may instruct the inference engine 660 as to how it should process to determine the action responsive to the user input and/or how it should generate the output including the action response to the user input. For example, as shown in the example above, the format may include the label "User:" labelling the following string of characters/tokens as the user input (which may include identifier data substituted in place of a reference to an entity in the original user input). For further example, the format may include the label "Thought:" instructing the inference engine 660 to generate an output representing the determined interpretation of the user input by the inference engine 660 (e.g., the user is requesting [intent of the user input], the user is trying to [intent of the user Input], etc.) As another example, the format may include the label "Observation:" labeling the following string of characters/tokens as the result of performance of an action determined by the inference engine 660/the inference engine 660's interpretation of the result of the performance of the action determined by the inference engine 660. As a further example, the format may include a label of "Response:" instructing the inference engine 660 to generate a response (e.g., a natural language output for a user) to the prompt.

Following such a template format, for example, and for a user input of "turn on the living room light" and corresponding API data, exemplar data, device state data, and other context data, the prompt generation component 650 may generate example prompt data 655*a:*

You have access to the following API's:
Routine.turn_on_device (device: [device name]) turns a device on.
Use the following format:
User: the input utterance of a user
Thought: optionally think about what to do
Action: take an action by calling APIs
Observation: what the API execution returns
. . . (this thought/action/action input/observation can repeat N times)
Thought: done
Response: the proper response to the user (end of turn)
Examples
User: turn on all indoor lights
Thought: the user is trying to turn lights on
Action: turn_on_device (device= "indoor light 1")
turn_on_device (device= "indoor light 2")
Observation: success success
Thought: time to respond
Response: Anything else I can help you with?
Context: the user has the following devices, bathroom light,
bedroom light, kitchen light, and living room light.
User: turn on the living room light.
}

In some embodiments, the prompt generation component 650 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include “Please generate a polite, respectful, and safe response and one that does not violate protected class policy.”

The inference engine 660 processes the prompt data 655 to generate model output data 665 representing an action responsive to the user input. For example, based on processing the example prompt data provided above, the inference engine 660 may output model output data 665: {“Thought: the user is trying to turn on the living room light; Action: turn_on_device (device=“living room light”),”} or the like. The model output data 665 is sent (at step 7) to the action plan generation component 670. The action plan generation component 670 may parse the model output data 665 to determine action plan data representing the action generated by the inference engine 660. For example, for the model output data 665: “Action: turn_on_device (device=“living room light”),” the corresponding action plan data may correspond to “turn_on_device (device=” living room light “)” (e.g., corresponding to the action generated by the inference engine 660, without the label of “Action”). In some embodiments, the action plan generation component 670 may determine an API call corresponding to the “Action” data included in the model output data 665. For example, in some embodiments, the action plan generation component 670 may fill in the arguments/inputs, if any, for the API call, which may be included in the action plan data. The action plan generated by the action plan generation component 670 may be sent to action plan execution component 680. For further example, in some embodiments, the action plan execution component 680 may fill in the arguments/inputs, if any, for the API call. In various examples, one or more of inference engine 660, action plan generation 670, and/or action plan execution component 680 may be combined and/or may be functionally performed by the same component.

In some embodiments, the LM orchestrator 630 (e.g., the action plan generation component 670 or another component of the LM orchestrator 630) may determine whether the inference engine 660 output satisfies certain conditions. Such conditions may relate to checking whether the output includes biased information (e.g., bias towards a protected class), harmful information (e.g., violence-related content, harmful content), profanity, content based on model hallucinations, etc. A model hallucination refers to when a model (e.g., a language model) generates a confident response that is not grounded in any of its training data. For example, the model may generate a response including a random number, which is not an accurate response to an input prompt, and then the model may continue to falsely represent that the random number is an accurate response to future input prompts. To check for an output being based on model hallucinations, the LM orchestrator 630 may use a knowledge base, web search, etc. to fact-check information included in the output.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a “computer-readable medium” can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:

receiving a first natural language request;

determining a first reference to a first entity in the first natural language request;

executing an application programming interface (API) call comprising the first entity to an entity resolution service;

determining, based on the API call, first resolved entity data comprising structured metadata indicating a plurality of attributes of the first entity;

generating first identifier data for the first resolved entity data;

storing, in a first memory location of a session cache, the first resolved entity data;

generating a mapping between the first identifier data and the first memory location of the session cache in which the first resolved entity data is stored;

generating a first language model (LM) prompt based on the first natural language request, wherein the first LM prompt comprises the first identifier data;

determining, by an LM using the first LM prompt, that additional information about the first entity is used to provide a response to the first natural language request;

generating, by the LM, a data request applicable to the first natural language request, wherein the data request comprises an API call comprising the first identifier data as an input parameter;

receiving, in response to the API call, at least a portion of the structured metadata of the first resolved entity data from the session cache;

generating a second LM prompt comprising at least the portion of the structured metadata;

generating, by the LM using the second LM prompt, a first natural language response to the first natural language request, wherein the first natural language response provides information about the first entity according to at least the portion of the structured metadata; and outputting the first natural language response.

2. The computer-implemented method of claim 1, wherein the first identifier data is temporally associated with the first resolved entity data during a first communication session that includes the first natural language request, and wherein the method further comprises:

determining an amount of time that has elapsed since a time at which the first natural language request was received;

determining that the amount of time exceeds a timeout threshold;

determining, based on the amount of time exceeding the timeout threshold, that the first communication session has ended; and in response to determining that the first communication session has ended:

deleting the mapping between the first identifier data and the first memory location of the session cache; and deleting the first resolved entity data from the session cache.

3. The computer-implemented method of claim 2, further comprising:

receiving, during a second communication session, a second natural language request comprising a second reference to a second entity;

determining, in response to receiving the second natural language request, second resolved entity data comprising structured metadata indicating a plurality of attributes of the second entity;

generating second identifier data for the second resolved entity data;

storing, in the first memory location of the session cache, the second resolved entity data; and generating a mapping between the second identifier data and the first memory location of the session cache in which the first resolved entity data is stored.

4. A method comprising:

receiving a first natural language request comprising a reference to a first entity;

determining, in response to receiving the first natural language request, first resolved entity data comprising structured metadata indicating a plurality of attributes of the first entity;

generating first identifier data associated with the first resolved entity data;

storing, in a session cache, the first resolved entity data in association with the first identifier data;

generating a first prompt based on the first natural language request, wherein the first prompt comprises the first identifier data;

generating, based on the first prompt, a data request applicable to the first natural language request, wherein the data request comprises the first identifier data as an input parameter;

receiving at least a portion of the structured metadata of the first resolved entity data from the session cache using the data request;

generating a second prompt comprising at least the portion of the structured metadata of the first resolved entity data; and performing, based on the second prompt, a first action with respect to the first entity in response to the first natural language request.

5. The method of claim 4, further comprising:

determining second resolved entity data associated with the reference to the first entity;

generating second identifier data associated with the second resolved entity data; and storing, in the session cache, the second resolved entity data in association with the second identifier data, wherein the first prompt comprises the second identifier data.

6. The method of claim 5, further comprising:

generating a ranking request comprising the first identifier data and the second identifier data as input parameters, wherein the ranking request comprises a request to rank the first identifier data and the second identifier data with respect to the first entity; and receiving, in response to the ranking request, a ranked entity identifier list comprising a plurality of identifier data including at least the first identifier data and the second identifier data, wherein the first action is performed in accordance with the ranked entity identifier list.

7. The method of claim 5, further comprising:

generating a pruning request comprising the first identifier data and the second identifier data as input parameters; and receiving, in response to the pruning request, a selected one of the first identifier data or the second identifier data based on a ranking of the first identifier data and the second identifier data with respect to the first entity, wherein the first action is performed in accordance with the selected one of the first identifier data or the second identifier data.

8. The method of claim 5, further comprising:

generating a disambiguation request applicable to the first natural language request, wherein the disambiguation request comprises the first identifier data and the second identifier data as input parameters;

receiving, in response to the disambiguation request, a natural language response comprising a reference to at least one of the first resolved entity data or the second resolved entity data;

outputting the natural language response; and receiving, in response to the natural language response, a second natural language request comprising a selection corresponding to one of the first resolved entity data or the second resolved entity data; and generating, based on the selection, a third prompt comprising identifier data corresponding to the selection.

9. The method of claim 4, further comprising:

receiving a second natural language request comprising a second reference to the first entity;

determining the second reference corresponds to the first entity; and generating a third prompt based on the second natural language request, wherein the third prompt comprises the first identifier data representing the second reference to the first entity.

10. The method of claim 4, wherein the first identifier data references a memory location of the session cache in which the first resolved entity data is stored.

11. The method of claim 4, wherein the first identifier data is temporally associated with the first resolved entity data during a communication session that includes the first natural language request, and wherein the method further comprises:

removing the association between the first identifier data and the first resolved entity data in response to a conclusion of the communication session.

12. The method of claim 4, further comprising:

deleting the first resolved entity data from the session cache in response to a conclusion of a communication session that includes the first natural language request.

13. A system comprising:

at least one processor; and non-transitory computer-readable memory storing instructions that, when executed by the at least one processor, are effective to:

receive a first natural language request comprising a reference to a first entity;

determine, in response to receiving the first natural language request, first resolved entity data comprising structured metadata indicating a plurality of attributes of the first entity;

generate first identifier data associated with the first resolved entity data;

store, in a session cache, the first resolved entity data in association with the first identifier data;

generate a first prompt based on the first natural language request, wherein the first prompt comprises the first identifier data;

generate, based on the first prompt, a data request applicable to the first natural language request, wherein the data request comprises the first identifier data as an input parameter;

receive at least a portion of the structured metadata of the first resolved entity data from the session cache using the data request;

generate a second prompt comprising at least the portion of the structured metadata of the first resolved entity data; and perform, based on the second prompt, a first action with respect to the first entity in response to the first natural language request.

14. The system of claim 13, the non-transitory computer-readable memory storing further instructions that, when executed by the at least one processor, are further effective to:

determine second resolved entity data associated with the reference to the first entity;

generate second identifier data associated with the second resolved entity data; and store, in the session cache, the second resolved entity data in association with the second identifier data, wherein the first prompt comprises the second identifier data.

15. The system of claim 14, the non-transitory computer-readable memory storing further instructions that, when executed by the at least one processor, are further effective to:

generate a ranking request comprising the first identifier data and the second identifier data as input parameters, wherein the ranking request comprises a request to rank the first identifier data and the second identifier data with respect to the first entity; and receive, in response to the ranking request, a ranked entity identifier list comprising a plurality of identifier data including at least the first identifier data and the second identifier data, wherein the first action is performed in accordance with the ranked entity identifier list.

16. The system of claim 14, the non-transitory computer-readable memory storing further instructions that, when executed by the at least one processor, are further effective to:

generate a pruning request comprising the first identifier data and the second identifier data as input parameters; and receive, in response to the pruning request, a selected one of the first identifier data or the second identifier data based on a ranking of the first identifier data and the second identifier data with respect to the first entity, wherein the first action is performed in accordance with the selected one of the first identifier data or the second identifier data.

17. The system of claim 14, the non-transitory computer-readable memory storing further instructions that, when executed by the at least one processor, are further effective to:

generate a disambiguation request applicable to the first natural language request, wherein the disambiguation request comprises the first identifier data and the second identifier data as input parameters;

receive, in response to the disambiguation request, a natural language response comprising a reference to at least one of the first resolved entity data or the second resolved entity data;

output the natural language response; and receive, in response to the natural language response, a second natural language request comprising a selection corresponding to one of the first resolved entity data or the second resolved entity data; and generate, based on the selection, a third prompt comprising identifier data corresponding to the selection.

18. The system of claim 13, the non-transitory computer-readable memory storing further instructions that, when executed by the at least one processor, are further effective to:

receive a second natural language request comprising a second reference to the first entity;

determine the second reference corresponds to the first entity; and generate a third prompt based on the second natural language request, wherein the third prompt comprises the first identifier data representing the second reference to the first entity.

19. The system of claim 13, wherein the first identifier data references a memory location of the session cache in which the first resolved entity data is stored.

20. The system of claim 13, the non-transitory computer-readable memory storing further instructions that, when executed by the at least one processor, are further effective to:

delete the first resolved entity data from the session cache in response to a conclusion of a communication session that includes the first natural language request.

* * * * *